Patented July 24, 1934

1,967,760

UNITED STATES PATENT OFFICE 1,967,760

MANUFACTURE OF CALCIUM MIXED SALTS OF POLYHYDROXYMONOCARBOXYLIC AND BIONIC ACIDS

Arthur Stoll and Ernst Burckhardt, Basel, Switzerland, assignors to firm Chemical Works, formerly Sandoz, Basel, Switzerland No Drawing. Application December 16, 1932, Serial No. 647,699. In Switzerland December 30, 1931

8 Claims. (Cl. 260—112)

The present invention relates to the manufacture of organic calcium salts which are easily soluble in water.

It has been found that new water-soluble organic calcium salts can be prepared by treating calcium salts of polyhydroxymonocarboxylic acids derived from aldoses with calcium salts of bionic acids derived from aldobioses, preferably in an aqueous medium and at an elevated temperature.

In this manner new easily water soluble compounds, probably calcium mixed salts of polyhydroxymonocarboxylicbionic acids are formed.

The present process may for instance be carried out in the following way. Equimolecular quantities of calcium salts of polyhydroxymonocarboxylic acids and of bionic acids are dissolved in water or in an aqueous organic solvent and the solution thus obtained is heated for a certain time, whereby the new compounds are formed.

The new salts may also be prepared by using as starting material basic calcium salts of polyhydroxymonocarboxylic acids, e. g. basic calcium gluconate, and treating this salt with a calculated quantity of a bionic acid.

For carrying out the present invention calcium salts of polyhydroxymonocarboxylic acids like those of gluconic-, mannonic-, galactonic acid and others may be used. Under the name of bionic acids are understood acids like lactobionic or maltobionic and similar acids derived from aldobioses.

The new calcium salts prepared as above indicated may be isolated from their solutions by evaporation to dryness or by means of an addition of a suitable organic solvent miscible with water. Sometimes it is not necessary to isolate the compounds prepared, as the obtained solutions may directly be used for injections, or other therapeutical purposes. In dry state they constitute white non-hygroscopic, sometimes crystallized compounds, which are easily soluble in water and possess valuable therapeutical properties.

That the compounds prepared according to the present process are mixed salts of polyhydroxymonocarboxylicbionic acids is made probable by their much better solubility in water than that of equimolecular mixtures of the components. By treating for instance a mixture consisting of 4.3 parts of anhydrous calcium gluconate and of 7.5 parts of calciumlactobionate with 100 parts of cold water, 0.8 part of calciumgluconate remain undissolved (which is soluble in water only to 3.3%), whereas 50 parts of the compound prepared as indicated above from the same starting material, are easily soluble in 100 parts of cold water.

The presence of a mixed-salt can also be proved by the fact, that from an aqueous solution containing 70% of the mixed salt (prepared by dissolving it in hot water) after standing for a certain time a compound precipitates in an undistinctly crystallized form. This compound contains 6.7% of calcium.

The following examples, without being limitative, illustrate the present process, the parts being by weight.

Example 1

430 parts of anhydrous calciumgluconate and 754 parts of calciumlactobionate are dissolved in 2000 parts of water and heated for a certain time.

After cooling down, the solution remains perfectly clear. The calcium mixed-salt can be isolated in dry form by evaporating the solution in vacuo or by adding thereto 2000 parts of methanol, whereby it is precipitated in form of a paste that becomes hard when treated with methanol.

In dry state it is a white non-hygroscopic powder containing 6:7% calcium and is easily soluble in water. When heated with hydrochloric acid, the lactobionic acid contained therein is split into gluconic acid and galactose, which reduces Fehling's solution and can be detected in this way. It possesses very valuable therapeutical properties.

Example 2

Equal volume parts of a supersaturated aqueous solution containing 8.6% anhydrous calcium gluconate and of a 15.8% aqueous solution of calcium lactobionate are introduced into a vessel, which is then hermetically closed and heated for one hour to 100° C. The solution thus obtained contains the easily soluble mixed salt, is perfectly stable and can be used for injections.

Example 3

Equimolecular quantities of gluconic acid, lactobionic acid and calciumhydroxide are heated together in water, whereby the first produced calcium salts combine to the mixed compound.

Example 4

23.4 parts of basic calcium gluconate are suspended in 100 parts of water and treated while heating with 35.8 parts of lactobionic acid. The intermediary calcium salts of gluconic acid and lactobionic acid yield then the new mixed salt.

Example 5

215 parts of calcium gluconate and 377 parts of calcium maltobionate are dissolved under heating in 1000 parts of water and the mixed salt is produced by heating this solution for a certain time. The new product can be isolated by treating the solution with methanol or by evaporating it to dryness.

In the dry state it is a white, non-hygroscopic powder, containing 6.7% of calcium and easily soluble in water. By heating its aqueous solution with hydrochloric acid, the salt yields glucose, which reduces Fehling's solution and can be determined with phenylhydrazine as phenylglucosazon.

Example 6

430 parts of calcium mannonate and 754 parts of calcium lactobionate are dissolved in 2000 parts of water, heated for a certain time and the new compound precipitated by means of methanol.

In dry state the new salt is a non-hygroscopic white powder, easily soluble in water and containing 6.7% of calcium. By heating its aqueous solution with hydrochloric acid, galactose which reduces Fehling's solution, is split off.

What we claim is:—

1. The calcium mixed salts containing in their molecule on each molecule of calcium one molecule of a polyhydroxymonocarboxylic acid derived from aldoses and one molecule of a bionic acid derived from aldobioses, which are in dry state white non-hygroscopic powders, easily soluble in water and containing 6.7% of calcium and whose aqueous solutions yield on heating with hydrochloric acid products that reduce Fehling's solution.

2. The calcium mixed salt of gluconic and lactobionic acid, composed of one molecule of calcium, one molecule of gluconic acid and one molecule of lactobionic acid, which is in dry state a white non-hygroscopic powder, easily soluble in water and containing 6.7% of calcium and whose aqueous solutions, when heated with hydrochloric acid, yield galactose that reduces Fehling's solution.

3. The calcium mixed salt of gluconic and maltobionic acid, composed of one molecule of calcium, one molecule of gluconic acid and one molecule of maltobionic acid, which is in dry state a white non-hygroscopic powder, easily soluble in water and containing 6.7% of calcium and whose aqueous solutions, when heated with hydrochloric acid, yield glucose that reduces Fehling's solution.

4. The calcium mixed salt of mannonic and lactobionic acid, composed of one molecule of calcium, one molecule of mannonic acid and one molecule of lactobionic acid, which is in dry state a white non-hygroscopic powder, easily soluble in water and containing 6.7% of calcium and whose aqueous solutions, when heated with hydrochloric acid, yield galactose, that reduces Fehling's solution.

5. The aqueous solutions of calcium mixed salts containing in their molecule on each molecule of calcium one molecule of a polyhydroxymonocarboxylic acid derived from aldoses and one molecule of a bionic acid derived from aldobioses, which solutions when treated with methanol yield a white precipitate of the mixed salt containing 6.7% of calcium, which are suitable for injections and which constitute valuable therapeutical preparations.

6. The aqueous solutions of calcium mixed salt of gluconic and lactobionic acid, which solutions when treated with methanol yield a white precipitate of the mixed salt containing 6.7% of calcium, which are suitable for injections and constitute valuable therapeutical preparations.

7. The aqueous solutions of calcium mixed salt of gluconic and maltobionic acid, which solutions when treated with methanol yield a white precipitate of the mixed salt containing 6.7% of calcium, which are suitable for injections and constitute valuable therapeutical preparations.

8. The aqueous solutions of calcium mixed salt of mannonic and lactobionic acid, which solutions when treated with methanol yield a white precipitate of the mixed salt containing 6.7% of calcium, which are suitable for injections and constitute valuable therapeutical preparations.

ARTHUR STOLL.
ERNST BURCKHARDT.